(12) United States Patent
Braun

(10) Patent No.: US 7,449,676 B2
(45) Date of Patent: Nov. 11, 2008

(54) METHOD FOR ASSEMBLING AN OPTICAL TRANSDUCER ELEMENT, AND OPTICAL TRANSDUCER ELEMENT ASSEMBLED BY THE METHOD

(75) Inventor: Paul-Wilhelm Braun, Troisdorf (DE)

(73) Assignee: PWB-Ruhlatec Industrieprodukte GmbH, Seebach (DE)

( * ) Notice: Subject to any disclaimer, the term of this patent is extended or adjusted under 35 U.S.C. 154(b) by 105 days.

(21) Appl. No.: 11/466,385

(22) Filed: Aug. 22, 2006

(65) Prior Publication Data

US 2007/0075238 A1    Apr. 5, 2007

Related U.S. Application Data

(63) Continuation-in-part of application No. 10/853,776, filed on May 24, 2004, now abandoned.

(51) Int. Cl.
    *G01D 5/34* (2006.01)
(52) U.S. Cl. .................................. 250/231.13
(58) Field of Classification Search .. 250/231.1–231.18
    See application file for complete search history.

(56) References Cited

U.S. PATENT DOCUMENTS 4,400,443 A * 8/1983 Green ......................... 428/571

5,155,401 A * 10/1992 Kanaya et al. ................. 310/89
5,566,561 A * 10/1996 Hucknall ....................... 70/209

FOREIGN PATENT DOCUMENTS

| DE | 29504883 U1 | 7/1995 |
| DE | 10016959.7 | 10/2001 |
| DE | 20120932 | 4/2002 |
| JP | 59185876 A * | 10/1984 |

OTHER PUBLICATIONS

English Translation of JP 59185876, 1984.*

* cited by examiner

*Primary Examiner*—Stephen Yam
(74) *Attorney, Agent, or Firm*—Darby & Darby P.C.

(57) ABSTRACT

An optical transducer device including an optical transducer element having preliminary and fine-adjustment openings, a printed circuit board, a motor shaft, a hub mounted to the motor shaft, and a sensor/emitter element that forms a sensor gap. The optical transducer element is positioned by, pre-positioning the shaft in the preliminary opening of the optical transducer element such that the peripheral edge is located outside the sensor gap, and laterally sliding the optical transducer element so that the motor shaft is positioned in the fine-adjustment opening of the optical transducer element such that the peripheral edge at least partially reaches into the sensor gap. The optical transducer element is then pressed onto the hub. Prior to positioning the optical transducer device, the circuit board is soldered to the device components, thereby protecting the optical transducer element from the negative effect of heat and solder residue.

6 Claims, 3 Drawing Sheets

METHOD FOR ASSEMBLING AN OPTICAL TRANSDUCER ELEMENT, AND OPTICAL TRANSDUCER ELEMENT ASSEMBLED BY THE METHOD

RELATED APPLICATIONS

This application is a continuation-in-part of U.S. patent application Ser. No. 10/853,776, entitled "Method for Centering an Optical Transducer Element, and Optical Transducer Element for Carrying out the Method," filed May 24, 2004, which is hereby incorporated by reference as if set forth in its entirety.

FIELD OF THE INVENTION

The present invention relates to a method for assembling an optical transducer device, and more particularly, to a method of assembly that accurately positions the optical transducer element and protects the optical transducer device during the assembly process.

BACKGROUND OF THE INVENTION

The invention relates to a method for assembling an optical transducer device. In addition to the assembly method, this invention specifically includes a method for mounting and positioning/centering optical transducer elements in the form of pulse raster disks or pulse raster rulers on motor shafts, tool carriages and/or sliding stages as well as on vertically or horizontally movable position transducers. The present invention provides a process that protects the optical transducer element from many of the harmful effects that may be encountered during the assembly process, accurately positions the optical transducer element, wherein the optical transducer elements run edgewise through the sensor gap of a sensor/emitter element for detecting a movement or position, and adheres the optical transducer element to a hub by means of an adhesive element. The invention further relates to an optical transducer device of a suitable configuration assembled by the invention.

An optical transducer element of this type must conform to stringent requirements. It is important not to damage the optical transducer element during mounting and positioning. Furthermore, it is important to ensure accuracy in the positioning of the element, and the quality of the resolution. In addition, the ability to accurately function when there are fluctuations in temperature, pressure, and/or humidity is vital. Since large-scale production parts are involved, design concepts are required to be production-oriented, characterized by a minimal component count and by selecting components that are as simple and as fail-safe as possible. Simply put, the design of the transducer element needs to be conducive to a quick and reliable adjustment process which delivers the required precision even under difficult assembly conditions. Moreover the transducer element has to be producible in an automated manufacturing process that provides a high level of assurance.

Traditionally, pulse raster disks are generally fastened on a rotating shaft by means of a hub. Either transparent pulse raster disks or reflecting pulse raster disks are used. In the case of a transparent disk, the light beam emitted by a light source on one side of the raster disk is chopped into light pulses when the disk is rotated. The light pulses are received by a sensor element positioned on the opposite side of the pulse raster disk. In the case of the reflecting pulse raster disks, the light source and the light sensor are positioned on the same side of the pulse raster disk, usually parallel to the rotation axis, so that a scanning of the pulse raster disk and pulse raster ruler respectively can take place in the most confined space. More details on this concept are described in the utility models DE 29504883 U1 and in DE 10016959.7, to PWB Ruhlatec Industrieprodukte GmbH, which are hereby incorporated by reference as if set forth in their entirety.

In order to simplify their adjustment, optical transducer elements can be combined in an assembly unit as described for example in the utility model DE 20120932 U1 (Applicant: PWB Ruhlatec Industrieprodukte GmbH), where a sensor/emitter unit 9 (see FIG. 1 of DE 20120932 U1) in U-shape is placed on a printed circuit board 5 which is fastened to the underside of the motor 1. The pulse raster disk is positioned on the shaft-end 2 of an electric motor 1 and its outside border area runs through the gap of the U-shaped sensor/emitter unit 9. However, this arrangement suffers from installation problems that can be described as follows:

The precision of the optical transducer element depends essentially on the position accuracy of the pulse raster disk on the motor shaft relative to the position of the sensor/emitter unit on the printed circuit board. A variety of soldered joints are to be made on the printed circuit board. The properties and position accuracy of the materials within the area reached by the soldering heat are negatively affected by the high temperature. Moreover the production can only be automated through a very expensive process in which the process assurance is put in question due to a large number of production steps.

OBJECT OF THE INVENTION

The objects of the present invention are therefore:
a) to develop a method of assembling an optical transducer element,
b) to develop a method of positioning an optical transducer element, and
c) to develop an optical transducer element of a suitable configuration so that a pulse raster disk or pulse raster ruler can be positioned and centered by the inventive method with a high degree of accuracy on a motor shaft, tool carriage and/or a sliding stage as well as on a vertically or horizontally movable position transducer.

The aim for the new method and the new optical transducer element of the present invention is to provide a technically simple way of realizing an automated large-scale production in which the reject rate is minimal (i.e., virtually zero) and which can be used to produce parts of the smallest dimensions.

SUMMARY OF THE INVENTION

According to the present invention, this foregoing task is solved through the features detailed in the patent claims. It is shown that in the design of the optical transducer elements according to the invention, the centering can be carried out with high precision in a multi-step assembly method. The new method and the new transducer element ensure that the harmful influence from the heat produced by the soldering process is eliminated. The process can be increased by the straight feed movements, and for the first time, an automation can be achieved with low construction costs.

BRIEF DESCRIPTION OF THE DRAWINGS

The invention will be explained in more detail below through several examples that are illustrated in the drawings, wherein.

DETAILED DESCRIPTION OF PREFERRED EMBODIMENTS

Figure 1:
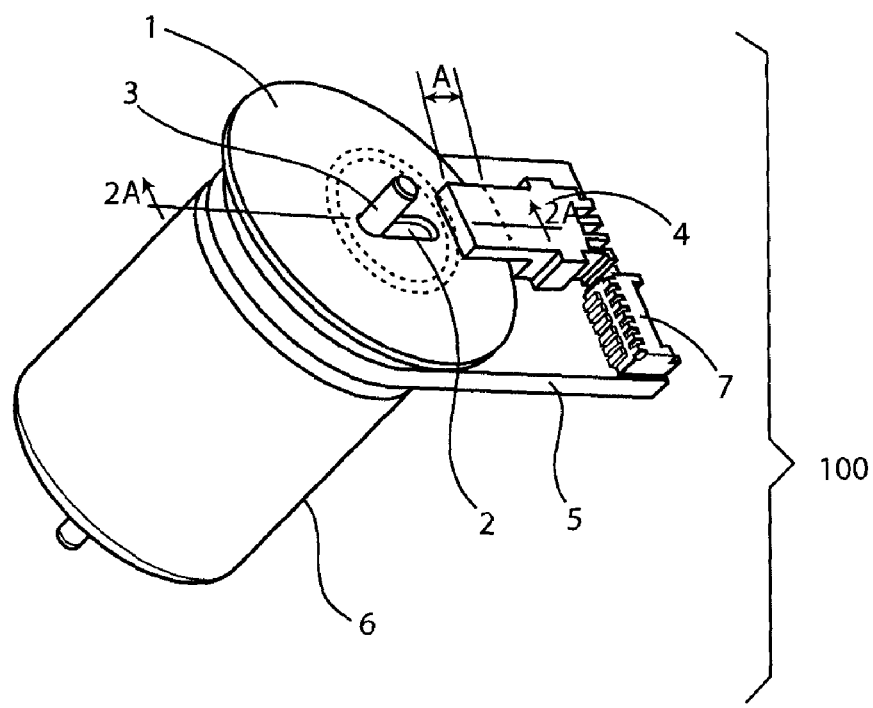
FIG. 1 represents an assembled optical transducer device.

The present invention relates to a method for assembling an optical transducer device as shown in FIG. 1. FIG. 1 illustrates an assembled optical transducer device 100 according to one embodiment of the present invention. The assembled optical transducer device 100 includes an optical transducer element 1, having an opening 2 (that includes the pre-positioning preliminary and centered fine-adjustment openings) for mounting and positioning the optical transducer element 1 on a hub 20 (FIG. 2) with an adhesive element 30 (FIG. 2) to a motor shaft 3. One side of the optical transducer element 1 includes a sensor/emitter unit 4 that is attached to a printed circuit board 5. The printed circuit board 5 can be seated on an electric motor 6 which has contact with a plug connector 7 through soldered joints (not shown).

The optical transducer element 1 can include a pulse raster disk or a pulse raster ruler. The optical transducer element is preferably manufactured from a film-like material for reliable and efficient mass-production.

The heat, vapor and spattering of solder particles generated during soldering can damage the optical transducer element 1 if the optical transducer element 1 is mounted to the motor shaft 3 before soldering components to the printed circuit board 5. Because of the possibility of damage to the optical transducer element 1 during the soldering components to the printed circuit board 5, according to the present invention, all soldering can be completed before the optical transducer element 1 is mounted and positioned on the motor shaft 3. Accordingly, the possibility of damage to the optical transducer element 1 from heat and solder residue is greatly reduced by soldering substantially all components (i.e. the motor contacts 7, sensor/emitter unit 4, etc.) to the printed circuit board 5 prior to mounting of the optical transducer element 1 to the motor shaft 3.

After the soldering is complete, the hub 20 can then be mounted on the motor shaft 3. Alternatively, the hub 20 may be mounted on the motor shaft 3 prior to soldering components onto the printed circuit board 5. However, both these steps are preferably completed before mounting and positioning the optical transducer element 1. The hub 20 allows for the mounting of the optical transducer element 1 onto the motor shaft 3. The hub 20 is a ring-shaped component that is smaller in diameter than the optical transducer element 1. The hub 20 may mount onto the motor shaft 3 below the optical transducer element 1 to allow the mounting of the optical transducer element 1. The positioning of the hub 20 on the motor shaft 3 is such that the optical transducer element 1 is correctly positioned in the sensor gap 40 of the sensor/emitter unit 4. The hub can include the adhesive element 30 that can be exposed to adhere the optical transducer element 1 to the hub 20.

After the optical transducer element 1 has been positioned on the hub 20, the adhesive element 30 can be used to adhere the optical transducer element 1 to the hub 20. Before the adhesive element 30 is exposed to secure the optical transducer element 1 to the hub 20, the optical transducer element 1 must be properly positioned on the hub 20. However, it is desirable to avoid contact with the adhesive element 30 before the optical transducer element 1 has been properly positioned. If the adhesive element 30 contacts the optical transducer element 1 prematurely, any resulting contamination could affect the optical transducer element's performance. Additionally, premature contact with the adhesive can make the optical transducer element 1 difficult to position on the motor shaft 3. Thus, the assembly process preferably ensures that the adhesive element 30 does not contact the optical transducer element 1 before the optical transducer element 1 has been properly positioned on the motor shaft 3. Therefore, the adhesive element 30 can be covered by a protective covering (e.g. silicone paper, not shown). After the optical transducer element 1 has been properly positioned on the motor shaft 3, the adhesive element 30 may be exposed by removing the protective covering to secure the optical transducer element 1 to the hub 20. Additionally, the optical transducer element 1 can be covered by a protective covering (not shown) that protects the optical transducer element 1 from harmful contaminants, and can be removed after it is mounted an properly positioned on the motor shaft 3.

Figure 2:
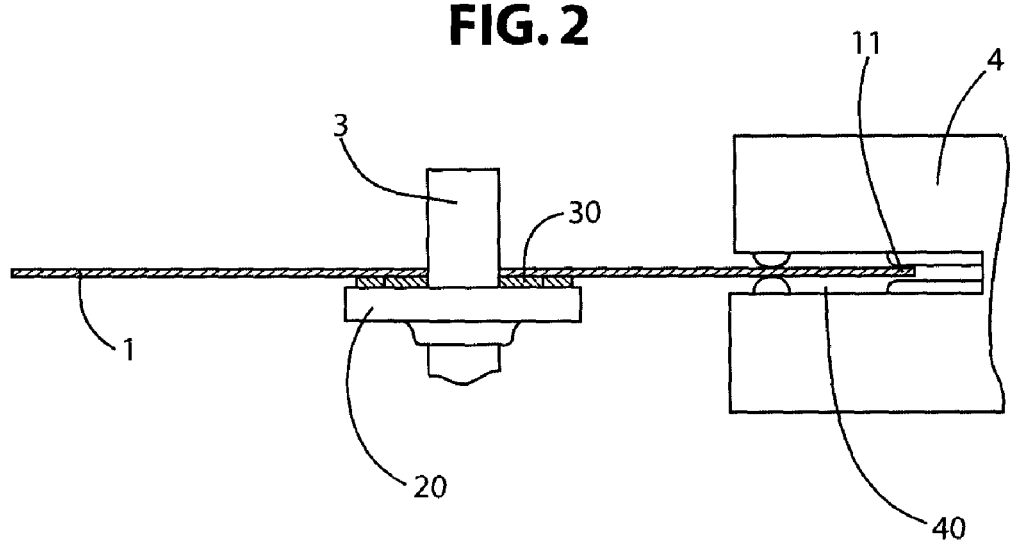
FIG. 2 represents a sectional view of a portion of the assembled optical transducer device.

FIG. 2 is a profile view of a portion of the optical transducer device 100, depicting the optical transducer element 1 mounted and positioned on the motor shaft 3 in accordance with one embodiment of the method of the present invention. The illustration in FIG. 2 shows the optical transducer device 1, positioned on the motor shaft 3, in a position where motor shaft 3 is positioned in the centered fine-adjustment opening 3.2 (see FIG. 2A). In this position, a peripheral edge 11 of the optical transducer element 1 extends at least partially within a sensor gap 40 within sensor/emitter unit 4. FIG. 2 further shows the optical transducer element 1 secured to the hub 20 by an adhesive element 30. The optical transducer element 1 is positioned and centered on the motor shaft 3 relative to the sensor/emitter unit 4. In order to ensure that the code marks on the pulse raster disk do not produce any unwanted pulse fluctuations as they move through a sensor gap 40, the optical transducer element 40 is preferably centered such that constant measuring conditions exist in the sensor gap 40 of the sensor/emitter unit 4.

Figure 2A:
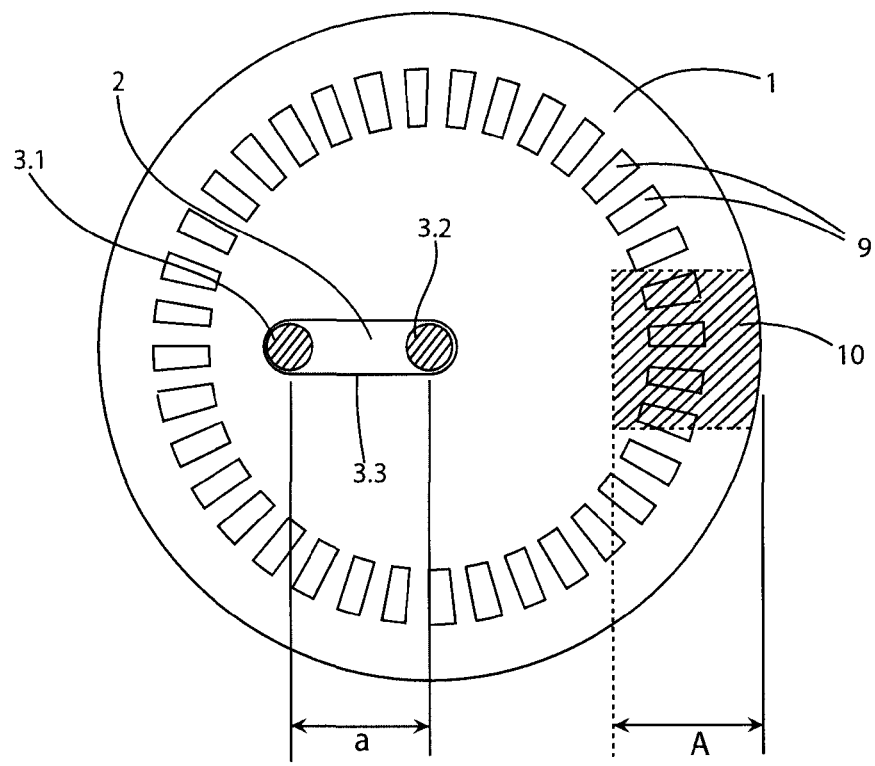
FIG. 2A represents an optical transducer element according to the invention with an elongated mounting hole.

FIG. 2A illustrates an exemplary embodiment of an optical transducer element 1. The optical transducer element 1 can include a pulse raster disk or a pulse raster ruler. The optical transducer element can include rotating code markers 9 arranged along a circumference at constant intervals which can be applied in a photo-optical process with an accuracy of better than one millionth of a meter. FIG. 2A further shows a scanning zone 10 with a width A (also referred to as "sensor projection area" 10), which has the same coverage as the sensor gap A in FIG. 1. The light signal being sent out from the emitter part of the sensor/emitter unit 4 is converted by the band of rotating markers 9 into electrical pulses.

The optical transducer element 1 in FIG. 2A can include a slotted hole 2 for the mounting of the disk on the motor shaft 3. FIG. 2A also illustrates multiple positions that the motor shaft 3 occupies during the positioning of the optical transducer element 1. The two positions 3.1 and 3.2 depict the positioning of the motor shaft 3 at different steps of the method of the present invention. The extreme positions of the motor shaft 3 in the slotted hole 2 are indicated by shading. Position 3.1 is the pre-positioning preliminary opening of the optical transducer element 1 on the motor shaft 3, and position 3.2 represents the centered fine-adjustment position. The length "a" of the transfer guide section 3.3 connects the pre-positioning preliminary opening 3.1 to the centered fine-adjustment opening 3.2, and corresponds to the width A of the sensor projection area 10. The sensor projection area 10 corresponds to the entry depth of the disk into the sensor gap.

Figure 3:
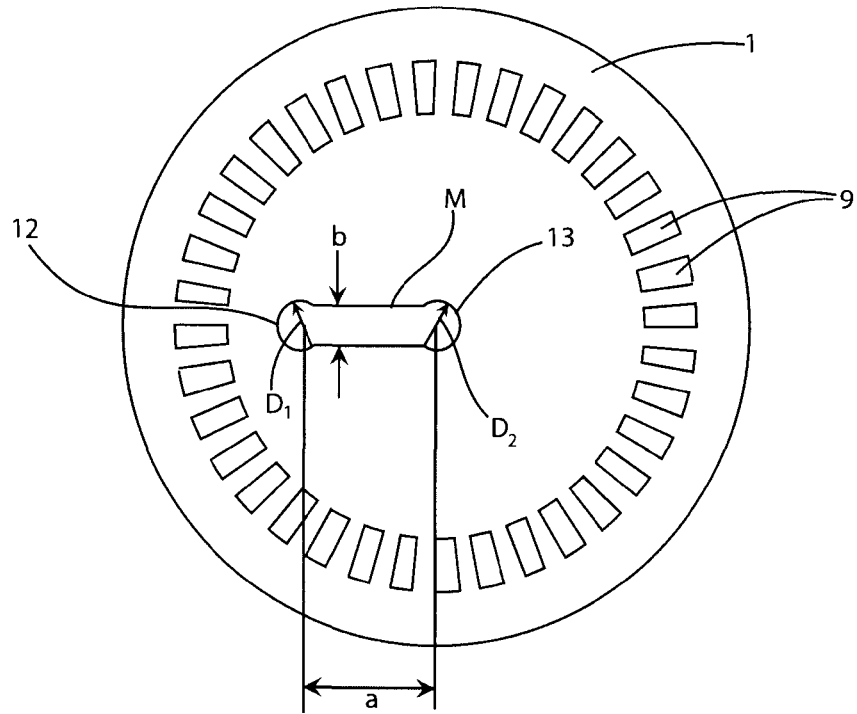
FIG. 3 represents an optical transducer element with a barbell-shaped mounting hole.

FIG. 3 illustrates a further embodiment of an optical transducer element, wherein the opening shown is a barbell-shaped hole M. This design provides an optimal centering of the optical transducer element 1 and simultaneously ensures a positive seating in either of the end positions. The positive seating is attained by the fact that the transfer guide section between the pre-positioning preliminary opening 12 and the centered fine-adjustment opening 13 has a narrower width b than either of the respective diameters D1, D2 of the pre-positioning part 12 or the centered adjustment part 13 of the barbell-shaped hole M.

Figure 4:
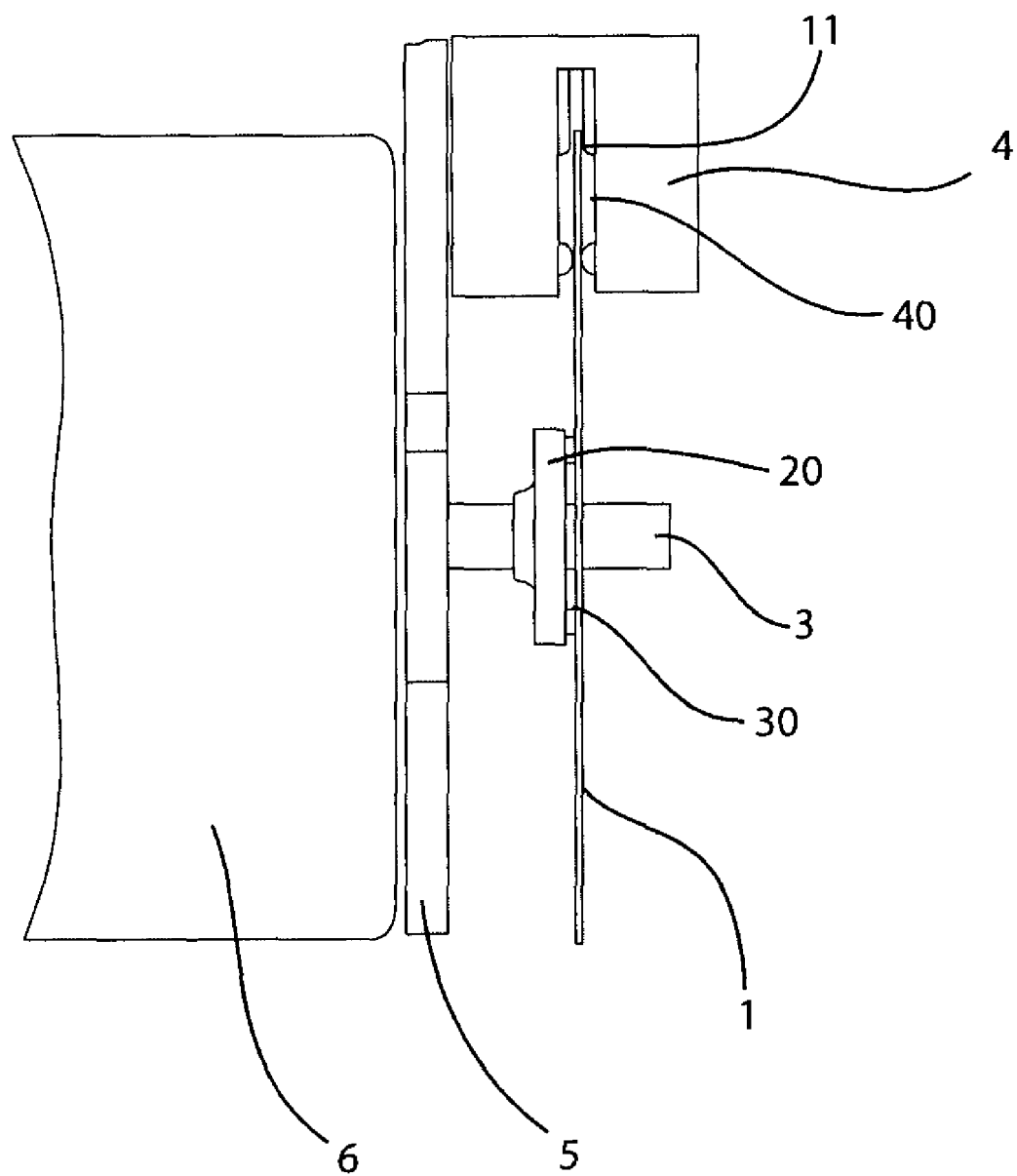
FIG. 4 represents a sectional view of the assembled optical transducer device.

FIG. 4 is a sectional view of a similar view as shown in FIG. 2. FIG. 4 illustrates an optical transducer device 100 assembled according to the claimed invention. Optical transducer element 1 is mounted on hub 20, secured by adhesive element 30. Motor shaft 3 is positioned in the fine-adjustment opening, and peripheral edge 11 is within the sensor gap 40 of the sensor/emitter unit 4.

While the present invention has been particularly shown and described with reference to preferred embodiments thereof, it will be understood by those skilled in the art that various changes in form from the spirit and scope of the invention.

The invention claimed is:

1. An optical transducer device comprising:
   a sensor/emitter element that forms a sensor gap;
   a motor shaft having a uniform diameter;
   a printed circuit board;
   a hub; and
   an optical transducer element comprising:
      a pre-positioning opening for a preliminary position of the hub;
      a fine-adjustment opening for a centered fine-adjustment position of the hub, the fine-adjustment opening having a diameter corresponding to the diameter of the motor shaft; and
      a guide feature comprising a slot-shaped hole having a transfer guide that runs radially from the pre-positioning opening to the fine-adjustment opening, said slot-shaped hole having a width smaller than the diameter of the motor shaft and narrower in said transfer guide section than in either of the pre-positioning or fine-adjustment openings,
   wherein the printed circuit board is soldered prior to mounting the optical transducer element,
      the hub is mounted on the motor shaft,
      the motor shaft is positioned in the preliminary opening of the optical transducer element such that the peripheral edge is located outside said sensor gap, and slid along the transfer guide section so as to position the motor shaft in the fine-adjustment opening of the optical transducer element such that the peripheral edge at least partially reaches into the sensor gap; and
      the optical transducer device is pressed onto the hub.

2. The optical transducer device of claim 1, wherein the optical transducer element comprises a circular pulse raster disk.

3. The optical transducer device of claim 1, wherein the optical transducer element comprises a pulse raster ruler.

4. The optical transducer device of claim 1, wherein the sensor/emitter element comprises a light source and a scanning element to receive the light pulses generated by the light source.

5. The optical transducer device of claim 1, wherein the optical transducer device is secured to the hub by an adhesive element.

6. The optical transducer device of claim 5, wherein the adhesive element is covered by a protective covering, and the optical transducer device is secured to the hub by the adhesive element after removing the protective covering from the adhesive element.

* * * * *